(12) United States Patent
Huang et al.

(10) Patent No.: US 11,089,476 B2
(45) Date of Patent: Aug. 10, 2021

(54) NETWORK ACCESS CONTROL METHOD AND APPARATUS

(71) Applicant: HUAWEI DEVICE CO., LTD., Guangdong (CN)

(72) Inventors: Xi Huang, Shenzhen (CN); Yongfeng Tu, Shenzhen (CN); Huangwei Wu, Shenzhen (CN)

(73) Assignee: Huawei Device Co., Ltd., Dongguan (CN)

( * ) Notice: Subject to any disclaimer, the term of this patent is extended or adjusted under 35 U.S.C. 154(b) by 135 days.

(21) Appl. No.: 16/039,179

(22) Filed: Jul. 18, 2018

(65) Prior Publication Data

US 2018/0324182 A1 Nov. 8, 2018

Related U.S. Application Data

(63) Continuation of application No. 15/021,812, filed as application No. PCT/CN2014/091033 on Nov. 13, 2014, now Pat. No. 10,063,546.

(30) Foreign Application Priority Data

Nov. 15, 2013 (CN) .......................... 201310574112.3

(51) Int. Cl.
*H04L 29/00* (2006.01)
*H04W 48/10* (2009.01)
(Continued)

(52) U.S. Cl.
CPC ......... *H04W 12/08* (2013.01); *H04L 63/0876* (2013.01); *H04L 63/104* (2013.01);
(Continued)

(58) Field of Classification Search
CPC ... H04L 63/0876; H04L 67/141; H04L 63/20; H04L 63/1416; H04L 63/104; H04L 63/10; H04W 12/08
See application file for complete search history.

(56) References Cited

U.S. PATENT DOCUMENTS

2003/0100308 A1 5/2003 Rusch
2006/0094400 A1 5/2006 Beachem et al.
(Continued)

FOREIGN PATENT DOCUMENTS

CN 1618208 A 5/2005
CN 101304318 A 11/2008
(Continued)

OTHER PUBLICATIONS

Ping Zhao; Wuwu Liu; Guanglin Zhang; Zongpeng Li; Lin Wang; "Preserving Privacy in WiFi Localization With Plausible Dummy Locations"; Year: 2020; vol. 69; Issue: 10; Journal Article; Publisher: IEEE; pp. 11909-11925 (Year: 2020).*
(Continued)

*Primary Examiner* — Kendall Dolly
*Assistant Examiner* — Courtney D Fields
(74) *Attorney, Agent, or Firm* — Fish & Richardson P.C.

(57) ABSTRACT

The present invention provides a network access control method. The network access control method includes: configuring network access permission of a first application, where the network access permission includes allowing the first application to access a network resource by using a first type of network access point, and the first type of network access point includes at least one first network access point; accessing a second network access point, where the second network access point belongs to the first type of network access point; when the first application is running, allowing the first application to access the network resource by using
(Continued)

the second network access point; and when a third network access point is accessed, if the third network access point does not belong to the first type of network access point, prohibiting the first application from accessing the network resource by using the third network access point.

20 Claims, 8 Drawing Sheets

(51) Int. Cl.
    *H04W 12/00*    (2021.01)
    *H04W 12/08*    (2021.01)
    *H04L 29/06*    (2006.01)
    *H04L 29/08*    (2006.01)
(52) U.S. Cl.
    CPC .......... *H04L 63/1416* (2013.01); *H04L 63/20* (2013.01); *H04L 67/141* (2013.01)

(56) References Cited

U.S. PATENT DOCUMENTS

| | | | |
|---|---|---|---|
| 2012/0127925 A1 | 5/2012 | Kim et al. | |
| 2019/0037465 A1* | 1/2019 | Srivastava | H04B 17/318 |
| 2019/0251285 A1* | 8/2019 | Tian | G06F 21/554 |

FOREIGN PATENT DOCUMENTS

| | | | |
|---|---|---|---|
| CN | 101567878 A | 10/2009 | |
| CN | 101841878 A | 9/2010 | |
| CN | 101860534 A | 10/2010 | |
| CN | 101867579 A | 10/2010 | |
| CN | 102170495 A | 8/2011 | |
| CN | 102348210 A | 2/2012 | |
| CN | 102573107 A | 7/2012 | |
| EP | 1343345 A2 | 9/2003 | |
| EP | 1465383 A1 | 10/2004 | |
| EP | 2456264 A2 * | 5/2012 | ............ H04W 12/08 |
| EP | 2456264 A2 | 5/2012 | |
| JP | 2003233543 A | 8/2003 | |
| WO | WO-2018011814 A1 * | 1/2018 | ............ H04L 29/00 |

OTHER PUBLICATIONS

Prasad Naldurg et al. Dynamic Access Control: Preserving Safety and Trust for Network Defense Operations, SAC M AT '03, Jun. 2-3, 2003. pp. 231-237.
Chinese Office Action issued in Chinese Application No. 201310574112.3 dated May 2, 2017, 15 pages.
Chinese Office Action issued in Chinese Application No. 201310574112.3 dated Apr. 24, 2018, 7 pages.
Extended European Search Report issued in European Application No. 14863031.2 dated Jun. 22, 2016, 6 page.
International Search Report and Written Opinion issued in International Application No. PCT/CN2014/091033 dated Jan. 28, 2015, 20 pages.
Office Action issued in Chinese Application No. 201810793854.8 dated Jul. 20, 2020, 10 pages (with English translation).

* cited by examiner

NETWORK ACCESS CONTROL METHOD AND APPARATUS

This application is a continuation of U.S. patent application Ser. No. 15/021,812, filed on Mar. 14, 2016, which is a national stage of International Application No. PCT/CN2014/091033, filed on Nov. 13, 2014, which claims priority to Chinese Patent Application No. 201310574112.3, filed with Chinese Patent Office on Nov. 15, 2013 and entitled "NETWORK ACCESS CONTROL METHOD AND APPARATUS". All of the afore-mentioned patent applications are hereby incorporated by reference in their entireties.

TECHNICAL FIELD

Embodiments of the present invention pertain to the field of network communications technologies, and in particular, relate to a network access control method and apparatus.

BACKGROUND

Currently, with the popularization of application of networks and electronic devices, a user may frequently switch between different networks by using an electronic device, and in this way, a same application may be executed in different networks.

For example, the user runs a DLNA (Digital Living Network Alliance, Digital Living Network Alliance) shared application at home, so as to share a multimedia resource on the electronic device with family members. After the user goes to an airport from home, the electronic device accesses a free WI-FI (Wireless Fidelity, Wireless) network at the airport. If the electronic device is still running the DLNA shared application at the moment, another electronic device that is in the same WI-FI network with the user may access the multimedia resource in the DLNA shared application.

Alternatively, the user is using a sensitive application such as online banking in the electronic device, and when the user switches from a home network to a free WI-FI network in a public place, the online banking application continues to run on the free WI-FI network in the public place.

However, an AP (Access Point, access point) of a free WI-FI network in a public place may be established by a hacker to steal user data. Therefore, when a network connection of the electronic device is switched to a free WI-FI network corresponding to such an AP, user data is stolen by a hacker, thereby reducing security of the user data.

SUMMARY

In view of this, an objective of embodiments of the present invention is to provide a network access control method, so as to resolve a problem in the prior art that security of user data is reduced because an electronic device accesses a free WI-FI network corresponding to an AP established by a hacker. The embodiments of the present invention further provide a network access control apparatus, so as to ensure actual implementation and application of the foregoing method. The technical solutions are as follows:

According to a first aspect, an embodiment of the present invention provides a network access control method, including:

configuring network access permission of a first application, where the network access permission includes allowing the first application to access a network resource by using a first type of network access point, and the first type of network access point includes at least one first network access point;

accessing a second network access point, where the second network access point belongs to the first type of network access point;

when the first application is running, allowing the first application to access the network resource by using the second network access point; and when a third network access point is accessed, if the third network access point does not belong to the first type of network access point, prohibiting the first application from accessing the network resource by using the third network access point.

In a first feasible manner of the first aspect, before the accessing the second network access point, the method further includes:

accessing a fourth network access point, where the fourth network access point does not belong to the first type of network access point;

running the first application, and determining that a network access point in a currently available network access point is a fifth network access point; and if the fifth network access point belongs to the first type of network access point, using the fifth network access point as the second network access point.

With reference to the first feasible manner of the first aspect, in a second feasible manner of the first aspect, if the fifth network access point does not belong to the first type of network access point, a sixth network access point is used as the second network access point, where the sixth network access point belongs to the first type of network access point.

With reference to the second feasible manner of the first aspect, in a third feasible manner of the first aspect, the using the sixth network access point as the second network access point includes:

selecting at least one first network access point in the first type of network access point as the sixth network access point;

activating a network connection function that is used to connect the selected sixth network access point; and if the selected sixth network access point is available, using the sixth network access point as the second network access point.

In a fourth feasible manner of the first aspect, if the third network access point does not belong to the first type of network access point, the first application is stopped.

With reference to the first aspect or any one of the first to fourth feasible manners of the first aspect, in a fifth feasible manner of the first aspect, after the third network access point is accessed, the method further includes:

keeping a connection to the second network access point.

With reference to the fifth feasible manner of the first aspect, in a sixth feasible manner of the first aspect, after the keeping a connection to the second network access point, the method further includes: keeping the first application accessing the network resource by using the second network access point.

With reference to the first aspect or any one of the first to fourth feasible manners of the first aspect, in a seventh feasible manner of the first aspect, the first network access point is a network access point that has trust permission, where the trust permission is used to identify a trust degree of the network access point.

According to a second aspect, an embodiment of the present invention provides a network access control apparatus, including:

a configuring unit, configured to configure network access permission of a first application, where the network access permission includes allowing the first application to access a network resource by using a first type of network access point, and the first type of network access point includes at least one first network access point;

an accessing unit, configured to access a second network access point, where the second network access point belongs to the first type of network access point;

a first control unit, configured to: when the first application is running, allow the first application to access the network resource by using the second network access point; and a second control unit, configured to: when a third network access point is accessed, if the third network access point does not belong to the first type of network access point, prohibit the first application from accessing the network resource by using the third network access point.

In a first feasible manner of the second aspect, the accessing unit is further configured to access a fourth network access point, and the fourth network access point does not belong to the first type of network access point; and the apparatus further includes: a running unit, a determining unit, and a first judging unit; where the running unit is configured to run the first application;

the determining unit is configured to determine that a network access point in a currently available network access point is a fifth network access point; and the first judging unit is configured to: if the fifth network access point belongs to the first type of network access point, use the fifth network access point as the second network access point.

With reference to the first feasible manner of the second aspect, in a second feasible manner of the second aspect, the apparatus further includes:

a second judging unit, configured to: if the fifth network access point does not belong to the first type of network access point, use a sixth network access point as the second network access point, where the sixth network access point belongs to the first type of network access point.

With reference to the second feasible manner of the second aspect, in a third feasible manner of the second aspect, the second judging unit includes: a selecting subunit, an activating subunit, and a judging subunit; where the selecting subunit is configured to select at least one first network access point in the first type of network access point as the sixth network access point;

the activating subunit is configured to activate a network connection function that is used to connect the selected sixth network access point; and the judging subunit is configured to: if the selected sixth network access point is available, use the sixth network access point as the second network access point.

In a fourth feasible manner of the second aspect, the second control unit is further configured to: if the third network access point does not belong to the first type of network access point, stop the first application.

With reference to the second aspect or any one of the first to fourth feasible manners of the second aspect, in a fifth feasible manner of the second aspect, the accessing unit is further configured to keep a connection to the second network access point.

With reference to the fifth feasible manner of the second aspect, in a sixth feasible manner of the second aspect, the first control unit is further configured to keep the first application accessing the network resource by using the second network access point.

With reference to the second aspect or any one of the first to fourth feasible manners of the second aspect, in a seventh feasible manner of the second aspect, the first network access point is a network access point that has trust permission, where the trust permission is used to identify a trust degree of the network access point.

In the embodiments of the present invention, network access permission is configured for a first application, where the network access permission includes allowing the first application to access a network resource by using a first type of network access point; if a third network access point that does not belong to the first type of network access point is accessed, the first application is prohibited from accessing the network resource by using the third network access point, thereby improving network security; further, when an electronic device accesses a network resource with relatively high security, security of a user resource that uses the electronic device can be improved.

BRIEF DESCRIPTION OF DRAWINGS

To illustrate the technical solutions in the embodiments of the present invention or in the prior art more clearly, the following briefly describes the accompanying drawings required for describing the embodiments or the prior art. Apparently, the accompanying drawings in the following description merely show some embodiments of the present invention, and persons of ordinary skill in the art can derive other drawings from the accompanying drawings without creative efforts.

DESCRIPTION OF EMBODIMENTS

The following first briefly describes a network access control method provided in embodiments of the present invention, where the network access control method may include:

configuring network access permission of a first application, where the network access permission includes allowing the first application to access a network resource by using a first type of network access point, and the first type of network access point includes at least one first network access point;

accessing a second network access point, where the second network access point belongs to the first type of network access point;

when the first application is running, allowing the first application to access the network resource by using the second network access point; and when a third network access point is accessed, if the third network access point does not belong to the first type of network access point, prohibiting the first application from accessing the network resource by using the third network access point.

In the embodiments of the present invention, network access permission is configured for a first application, where the network access permission includes allowing the first application to access a network resource by using a first type of network access point; if a third network access point that does not belong to the first type of network access point is accessed, the first application is prohibited from accessing the network resource by using the third network access point, thereby improving network security; further, when an electronic device accesses a network resource with relatively high security, security of a user resource that uses the electronic device can be improved.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some of the embodiments of the present invention but not all of the embodiments. All other embodiments obtained by a person of ordinary skill in the art based on the embodiments in the embodiments of the present invention without creative efforts shall fall within the protection scope of the embodiments of the present invention.

Figure 1:
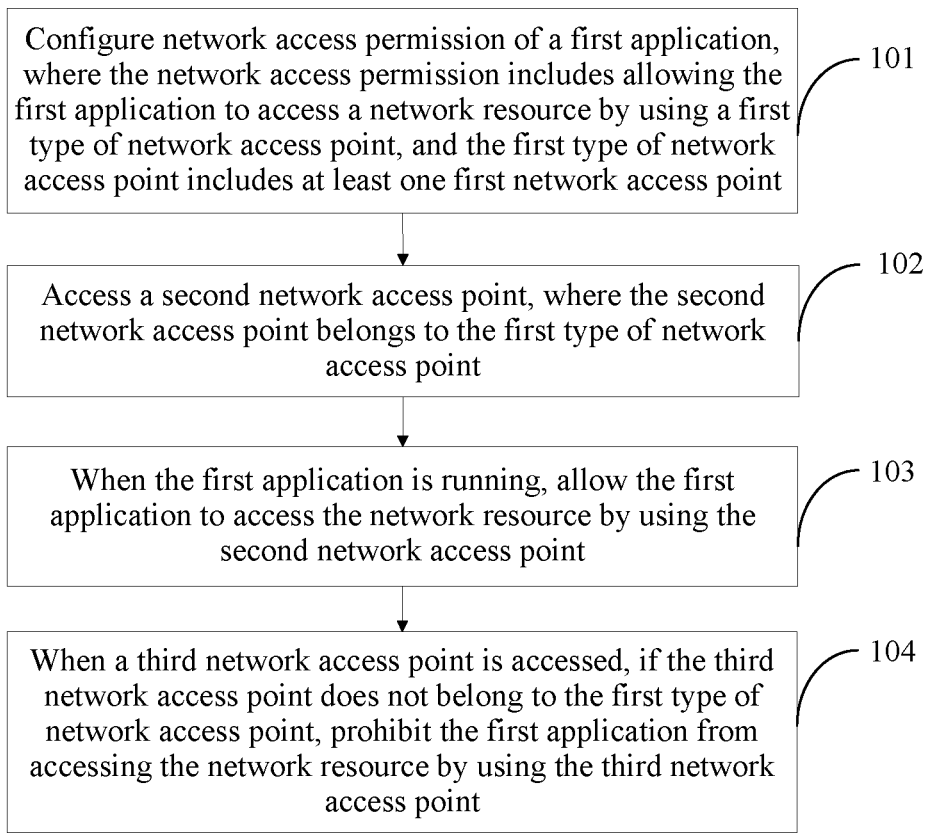
FIG. 1 is a flowchart of a network access control method according to an embodiment of the present invention.

Referring to FIG. 1, FIG. 1 shows a flowchart of a network access control method according to an embodiment of the present invention, and the method may include the following steps:

Step 101: Configure network access permission of a first application, where the network access permission includes allowing the first application to access a network resource by using a first type of network access point, and the first type of network access point includes at least one first network access point.

It can be understood that the first type of network access point may be configured according to an application feature of the first application. For example, when the first application is an online play video, because the online play video has an application feature that a required data volume is relatively large and a data transmission rate is required to be high, a 3G (3rd-generation, 3rd-generation mobile communications technology) type of network access point may be configured for the online play video, and the 3G type of network access point is used as the first type of network access point; accordingly, the first network access point is a 3G network access point.

Likewise, when the first application is instant communication software, because the instant communication software has a relatively high requirement for immediacy of communication, a network access point that supports communication anytime and anywhere needs to be configured for the instant communication software. A wireless network can satisfy this requirement; therefore, a wireless type of access point may be used as a first type of network access point of the instant communication software, and a wireless network access point is used as the first network access point.

Figure 2:
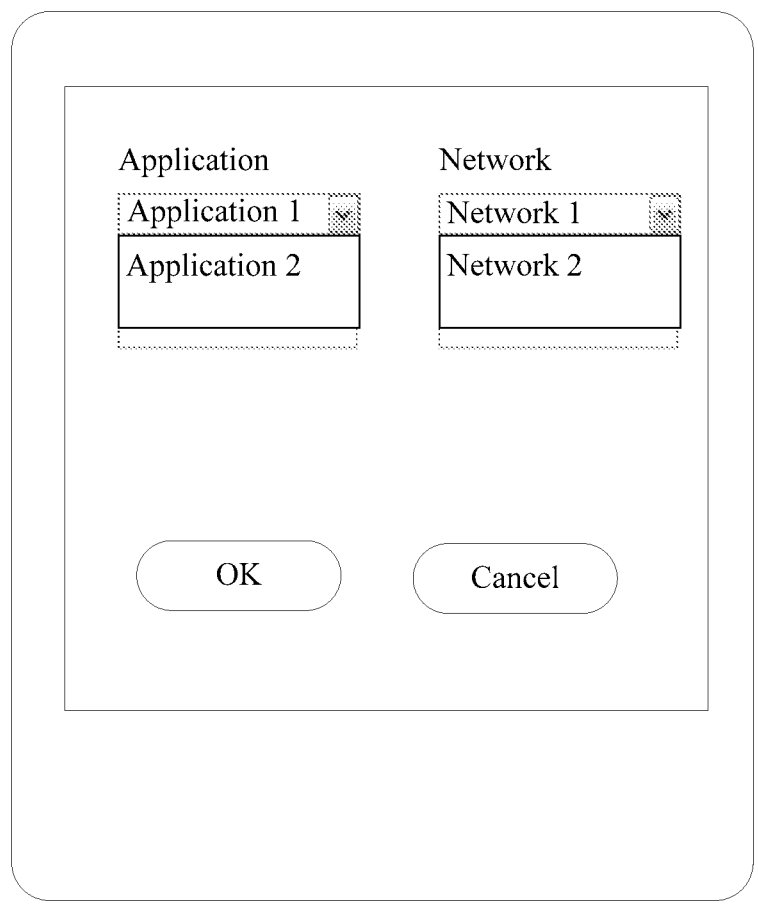
FIG. 2 is a schematic diagram of a human-computer interaction interface according to an embodiment of the present invention.

Certainly, in actual use of an electronic device, a human-computer interaction interface shown in FIG. 2 may be displayed on a display interface of the electronic device, where the human-computer interaction interface is used to manually configure the network access permission of the first application. After the corresponding network access permission is configured, the first application may access the network resource by using the configured first type of network access point.

The human-computer interaction interface includes two drop-down boxes: application and network. A user may select, from the application drop-down box, a first application for which a network needs to be configured. After selecting the first application for which a network needs to be configured, the user further selects a network type from the network drop-down box, and after an OK button is clicked, an access point of the selected network type is used as a first type of network access point of the first application. Each time after a network is selected and the OK button is clicked, it indicates that a type of first network access point is configured for the first application. In actual configuration, the user may configure a first network access point that involves a single type for the first application, or may configure first network access points that involve multiple types.

Figure 3:
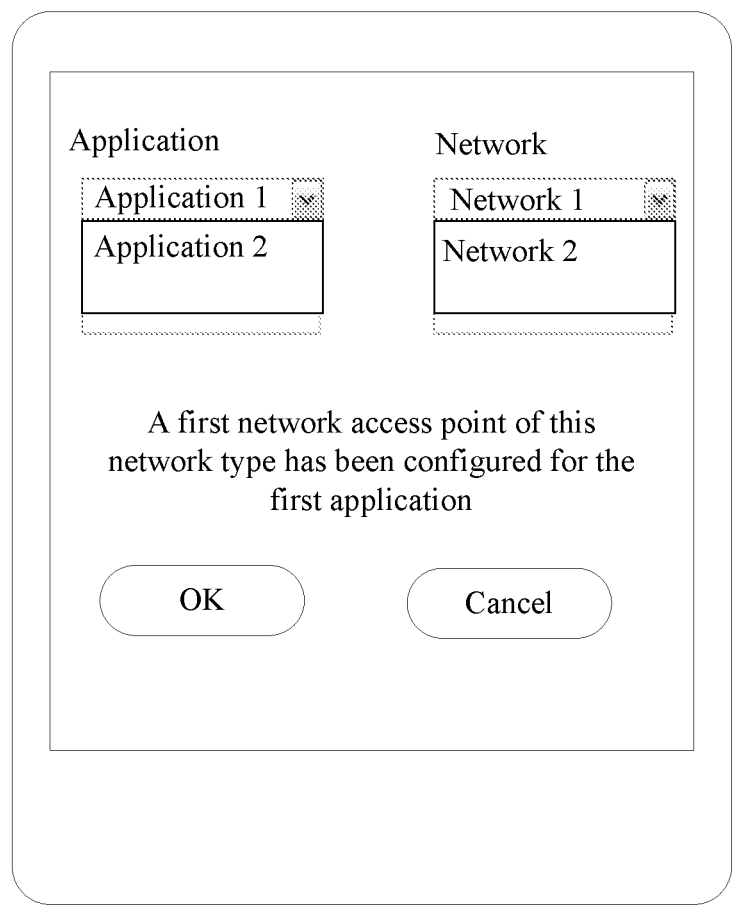
FIG. 3 is a schematic diagram of another human-computer interaction interface according to an embodiment of the present invention.

Certainly, if a network selected by the user is a network that has been configured for the first application, "A first network access point of this network type has been configured for the first application" may be displayed on the human-computer interaction interface, as shown in FIG. 3, so as to prompt the user not to configure a first network access point of the same network type for the first application again.

Figure 4:
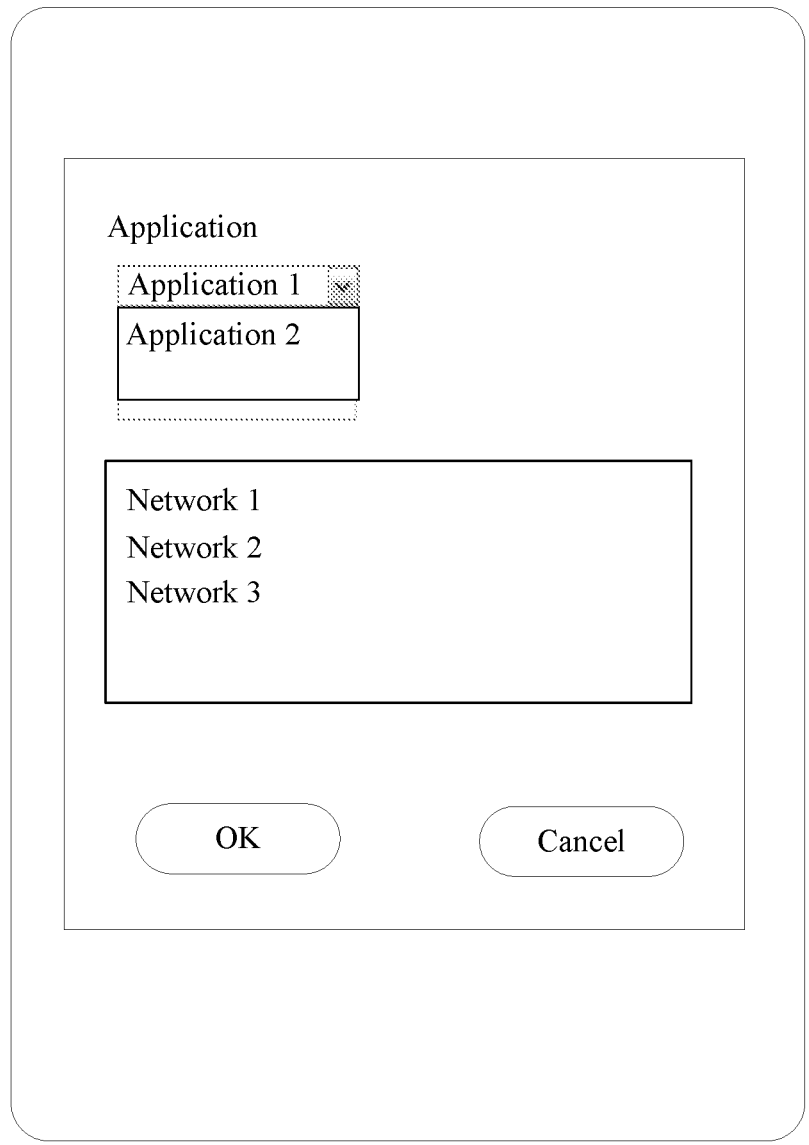
FIG. 4 is a schematic diagram of still another human-computer interaction interface according to an embodiment of the present invention.

In addition, the human-computer interaction interface displayed on the display interface of the electronic device may also use a manner show in FIG. 4, and an optional network is displayed in a box below the application drop-down box. After the user selects a first application, multiple networks in the box may be selected at the same time, and first network access points of multiple network types are configured for the first application.

When a first network access point is manually configured for various first applications, the electronic device records, in a configuration file, the network type and the first network access point that are configured and the first applications, as shown below:

```
<network-config>
<app_name="app_1">
<network_type="WI-FI">
<ap_mac_add=" 00-23-5A-15-99-42">
</network-config>
``` app_name represents a name of a first application; network_type represents a network type, which may include a 2G (2nd-generation, 2nd-generation mobile communications technology) network, a 3G network, a WI-FI network, and an LTE (Long Term Evolution, Long Term Evolution) network; ap_mac_add represents a MAC (Media Access Control, Media Access Control) address of the WI-FI network.

It should be noted that, for the 2G network, the 3G network, and the LTE network, these networks are provided by an operator, and construction of these network is much more complex relative to construction of the WI-FI network; therefore, a hacker generally can only tamper with the MAC address of the WI-FI network. Therefore, when configurations of the foregoing first applications are being recorded, and when WI-FI is recorded in network_type, the MAC address of the WI-FI network needs to be correspondingly recorded in ap_mac_add. When 2G 3G, and LTE are recorded in network_type, ap_mac_add is correspondingly left blank.

In this embodiment of the present invention, the first network access point may be a wireless network access point, where the wireless network access point may include at least one of the following access points: a 2G network access point, a 3G network access point, an LTE network access point, a WI-FI network access point, a Bluetooth network access point, a Zigbee (ZigBee) network access point, and a WAPI (Wireless LAN Authentication and Privacy Infrastructure, WLAN Authentication and Privacy Infrastructure) network access point. The first network access point may also be a wired network access point, where the wired network access point may include: an Ethernet access point, a USB (Universal Serial Bus, Universal Serial Bus) network shared access point, and the like. Certainly, the first network access point may also include both a wireless network access point and a wired network access point. Specifically, the electronic device may allocate any one type of or multiple types of access points to a first application according to an application feature of the first application, which is not limited in this embodiment of the present invention.

Certainly, the first network access point may also be a network access point that has trust permission, where the trust permission is used to identify a trust degree of the network access point. The trust degree may be represented by using a _TRUST_LEVEL field in a network identifier table shown in Table 1. The _TRUST_LEVEL field is a network identifier. When the network identifier is a trust identifier TRUE, it indicates that the network access point is a first network access point that belongs to the first type of network access point, and the first application is allowed to access the network resource by using the network access point. When the network identifier is any one of distrust identifiers UNDEFINED and FALSE, it indicates that the network access point does not belong to the first network access point of the first type of network access point, and the first application is prohibited from accessing the network resource by using the network access point.

TABLE 1

Network identifier table

| _NO | _NAME | _TRUST_LEVEL |
| --- | --- | --- |
| 1 | Network_A | UNDEFINED |
| 2 | Network_B | FALSE |
| 3 | Network_C | TRUE |

In addition, in a running process of the electronic device, the user may also change a network identifier in the network identifier table, for example, change a network identifier of Network_A to TRUE. Certainly, the user may also add a network identifier of another network to the network identifier table.

Step 102: Access a second network access point, where the second network access point belongs to the first type of network access point.

Step 103: When the first application is running, allow the first application to access the network resource by using the second network access point.

In this embodiment of the present invention, after being powered on, the electronic device may directly access the second network access point that belongs to the first type of network access point, where the second network access point is a first network access point in the first type of network access point, so as to ensure that when running the first application, the electronic device may access the network resource by using the second network access point, thereby improving execution efficiency of the first application.

The network resource is an information resource that is propagated by using a communication device and that is managed by using network software by using a computer system, such as a video uploaded to a network.

Step 104: When a third network access point is accessed, if the third network access point does not belong to the first type of network access point, prohibit the first application from accessing the network resource by using the third network access point.

After accessing the third network access point, the electronic device first determines whether the third network access point belongs to the first type of network access point. If the third network access point belongs to the first type of network access point, the first application is allowed to access the network resource by using the third network access point.

If the third network access point does not belong to the first type of network access point, it indicates that when the first application is configured, the first application is prohibited from accessing the network resource by using the third network access point. In this case, the electronic device prohibits the first application from sending or receiving information by using the third network access point, and prohibits the first application from accessing the network resource by using the third network access point, so as to improve network security. After the network security is improved, security of a user resource that accesses the network is accordingly improved.

Figure 5A:
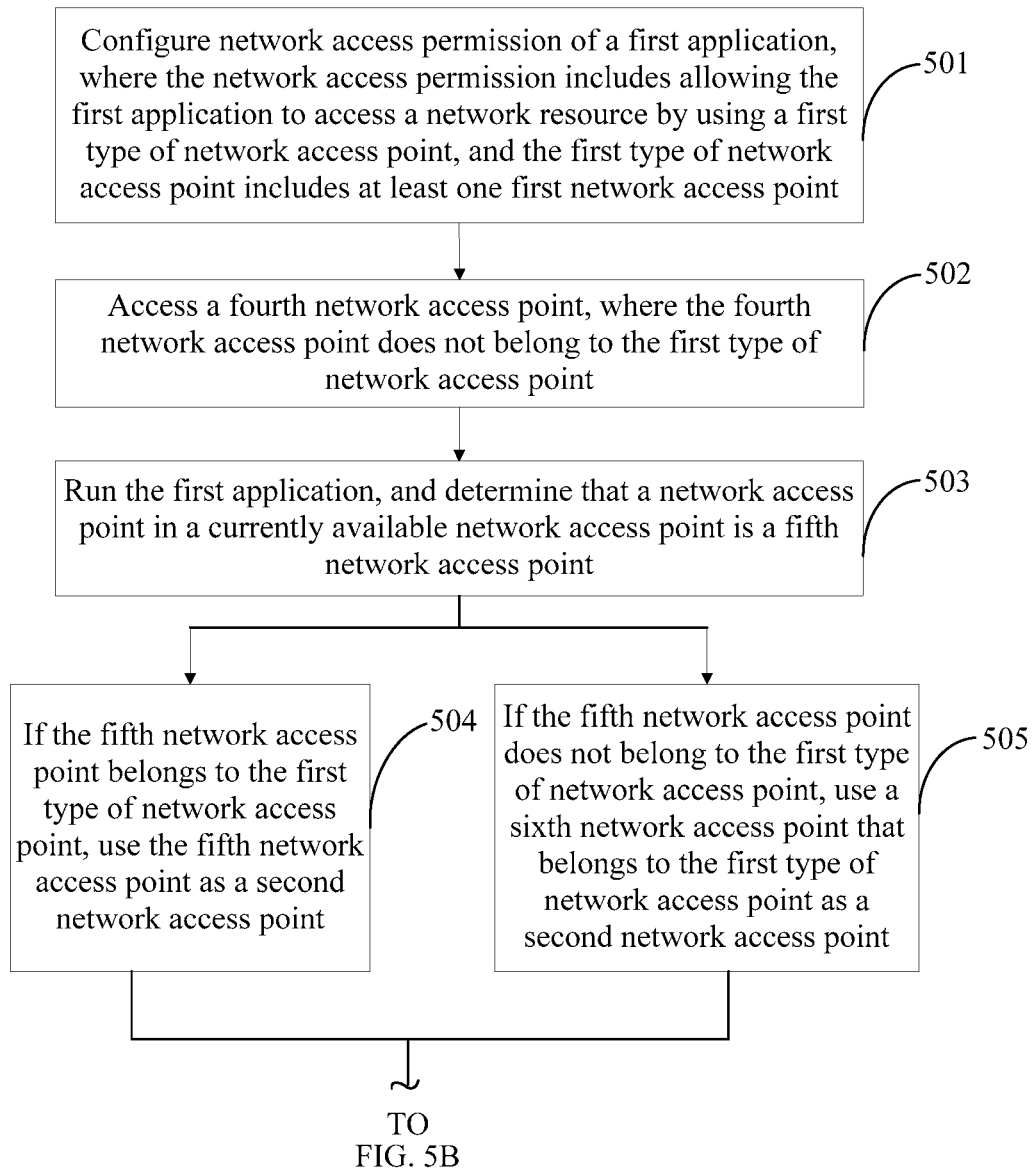
FIG. 5A and FIG. 5B are another flowchart of a network access control method according to an embodiment of the present invention.
Figure 5B:
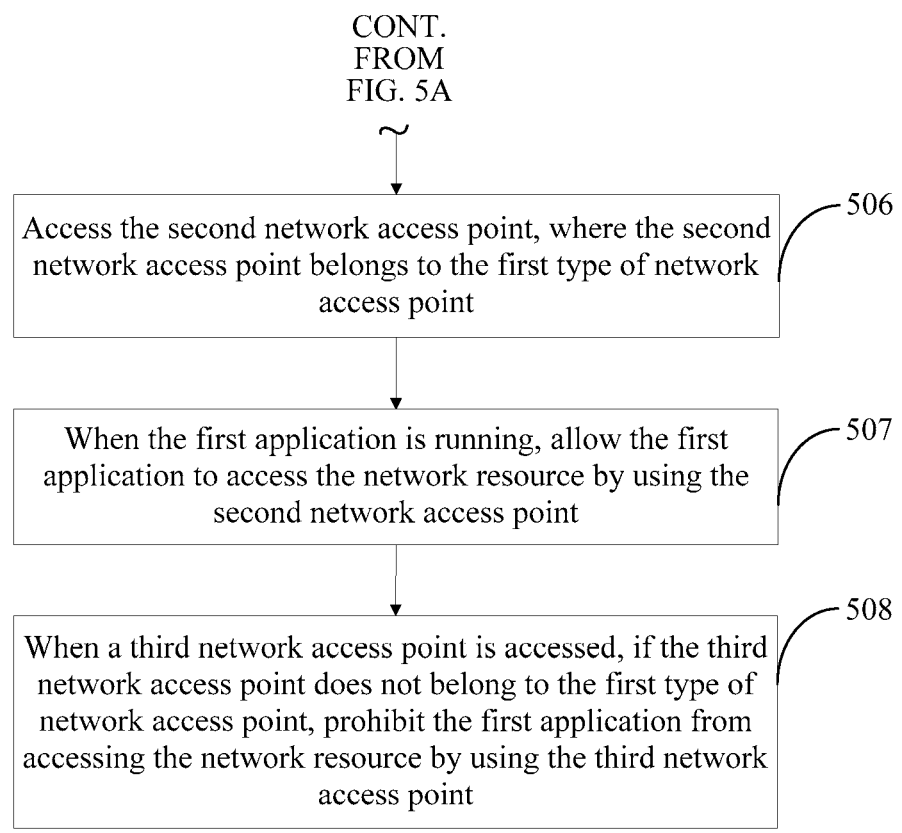

Referring to FIG. 5A and FIG. 5B, FIG. 5A and FIG. 5B show another flowchart of a network access control method according to an embodiment of the present invention, and the method may include the following steps:

Step 501: Configure network access permission of a first application, where the network access permission includes allowing the first application to access a network resource by using a first type of network access point, and the first type of network access point includes at least one first network access point.

Step 501 is the same as step 101, and is not described in this embodiment of the present invention again.

Step 502: Access a fourth network access point, where the fourth network access point does not belong to the first type of network access point.

In this embodiment of the present invention, a quantity of first applications that are in an electronic device and for which the network access permission needs to be configured is limited. If the electronic device directly accesses a second network access point after being powered on, when another application accesses the network resource, the electronic device needs to change an access point configuration. Therefore, in this embodiment of the present invention, the electronic device may directly access the fourth network access point that does not belong to the first type of network access point, so that the another application can directly access the network resource after the electronic device is powered on.

Step 503: Run the first application, and determine that a network access point in a currently available network access point is a fifth network access point.

An icon of the first application is displayed on an interface of the electronic device, and after the icon of the first application is operated, the corresponding first application starts to run.

After the first application runs, the electronic device detects the currently available network access point, and after the currently available network access point is detected, one of the currently available network access point is selected as the fifth network access point. An available network access point refers to a network access point whose network connection function is activated and that is located in network coverage corresponding to the network access point.

Step 504: If the fifth network access point belongs to the first type of network access point, use the fifth network access point as a second network access point, and perform step 506.

Step 505: If the fifth network access point does not belong to the first type of network access point, use a sixth network access point as a second network access point, where the sixth network access point belongs to the first type of network access point, and perform step 506.

The electronic device detects whether the fifth network access point belongs to the first type of network access point, and if the fifth network access point belongs to the first type of network access point, the fifth network access point is used as the second network access point. If the fifth network access point does not belong to the first type of network access point, the sixth network access point that belongs to the first type of network access point is used as the second network access point.

A specific process of using the sixth network access point that belongs to the first type of network access point as the second network access point may be: first selecting at least one first network access point in the first type of network access point as the sixth network access point, where the selected first network access point may be a configured network access point in step 501, and certainly the selected first network access point may also be a network access point that the electronic device accesses after the electronic device runs the first application, where the network access point is a trusted network access point selected by a user. After a network access point is selected by the user, the electronic device identifies that the network access point has trust permission, so as to identify a trust degree of the network access point. For a trust degree identifier of the network access point, refer to Table 1.

After determining the sixth network access point, the electronic device activates a network connection function that is used to connect the selected sixth network access point. If the selected sixth network access point is available, the sixth network access point is used as the second network access point.

Activation refers to enabling the network connection function. For example, the electronic device performs actions such as turning on a WI-FI switch, turning on a data traffic switch, and turning on a Bluetooth switch, and corresponding network connection functions are activated. All wireless network connection functions have a specific use range limit; therefore, being available is that in a current environment, the selected sixth network access point can be found by the electronic device and can be used for connection.

A WI-FI network connection function is used as an example. Activating the network connection function that is used to connect the selected sixth network access point is turning on the WI-FI switch of the electronic device; then, a nearby available WI-FI network access point is found by using a WI-FI module of the electronic device, and a network access point corresponding to the sixth network access point is searched for from the nearby available WI-FI network access point; and if the network access point is found, it indicates that the sixth network access point is available currently, and if the network access point is not found, the sixth network access point is unavailable currently.

The network connection function may be a wireless network connection function, where the wireless network connection function may include at least one of the following network connection functions: a Bluetooth network connection function, a WI-FI network connection function, a 2G/3G/4G network connection function, a Zigbee network connection function, a WAPI network connection function, and the like. Certainly, the network connection function may also be a wired network connection function, which includes: a USB network connection function, an Ethernet connection function, and the like.

In addition, the network connection function may include both a wireless network connection function and a wired network connection function. A type of the network connection function is the same as a type of the sixth network access point. If the sixth network access point is a WI-FI network access point, when the network connection function a WI-FI network connection function.

Step 506: Access the second network access point, where the second network access point belongs to the first type of network access point.

Step 507: When the first application is running, allow the first application to access the network resource by using the second network access point.

Step 508: When a third network access point is accessed, if the third network access point does not belong to the first type of network access point, prohibit the first application from accessing the network resource by using the third network access point.

Step 506 to step 508 are the same as step 102 to step 104, and are not described in this embodiment of the present invention again.

In this embodiment of the present invention, in a case in which a currently available fifth network access point does not belong to a first type of network access point, an electronic device selects at least one first network access point from the first type of network access point as a sixth network access point, activates a network connection function of the sixth network access point, and in a case in which the sixth network access point is available, accesses the sixth network access point as a second network access point, which improves operation flexibility.

Figure 6:
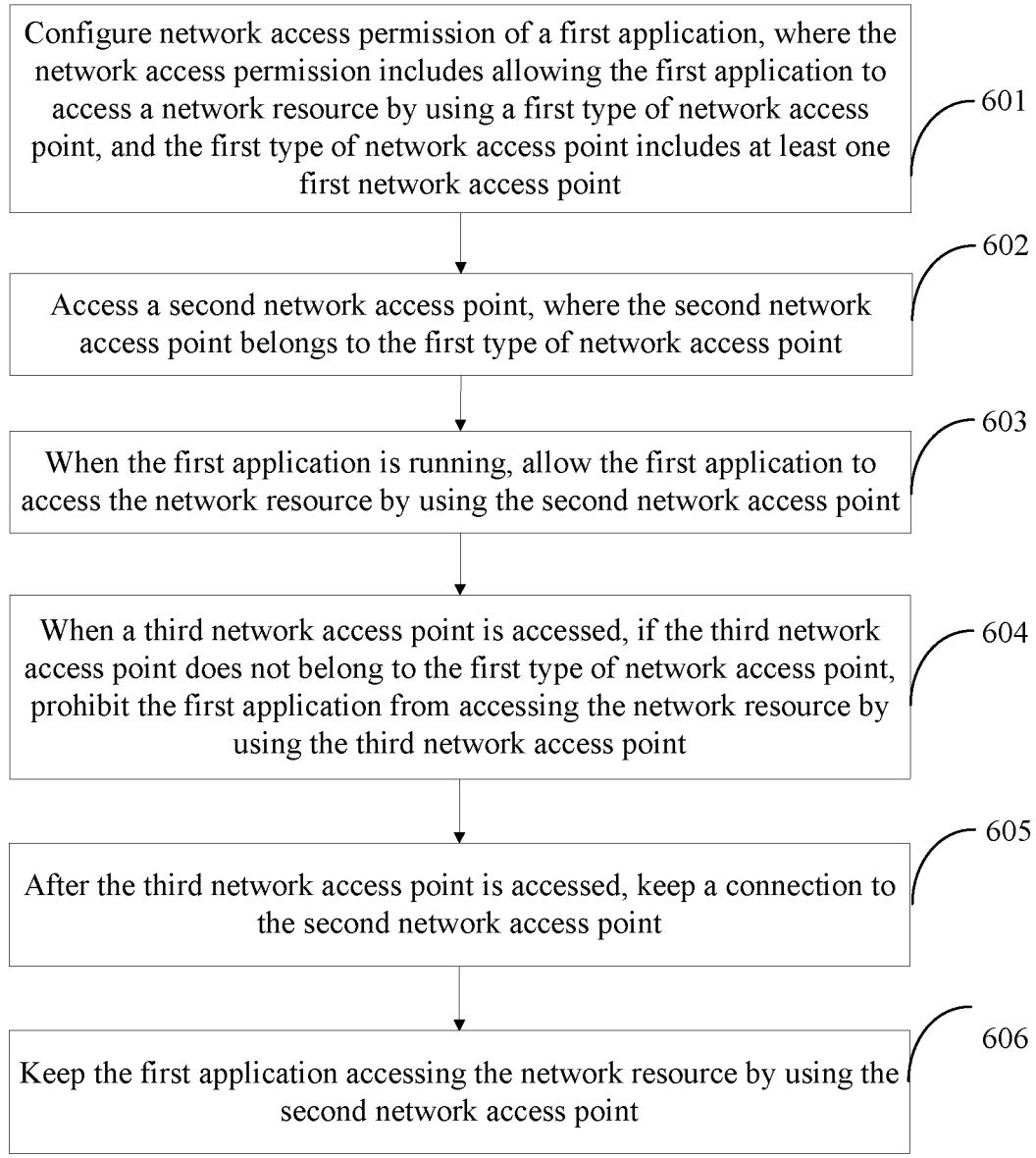
FIG. 6 is still another flowchart of a network access control method according to an embodiment of the present invention.

Referring to FIG. 6, FIG. 6 shows still another flowchart of a network access control method according to an embodiment of the present invention, where the network access control method shown in the flowchart may be applied to an electronic device that supports access of at least two types of network access points at the same time.

It can be understood that the electronic device may include multiple network modules, and each network module represents that access of a type of network access point is supported by the electronic device. For example, when the electronic device has a mobile network module and a WI-FI network module, it indicates that the electronic device can support access to both a mobile network and a WI-FI network. The mobile network may be a 2G network, or a 3G network, or an LTE network that is provided by an operator, which specifically needs to be determined by the mobile network module in the electronic device. Certainly, if the electronic device has two same network modules, such as WI-FI network modules, the electronic device can also support access to two WI-FI networks.

The foregoing network access control method shown in FIG. 6 may include the following steps:

Step 601 to step 604: the same as step 101 to step 104, and are not described in this embodiment of the present invention again.

Step 605: After the third network access point is accessed, keep a connection to the second network access point.

Step 606: Keep the first application accessing the network resource by using the second network access point.

In this embodiment of the present invention, after an electronic device accesses a third network access point, the electronic device keeps a connection to a second network access point. In this case, a first application can still access a network resource by using the second network access point, and another application may access the network resource by using the third network access point, which improves flexibility of access point configuration.

Certainly, in the foregoing network access control method shown in FIG. 5A and FIG. 5B, the connection to the second network access point may also be kept after the third network access point is accessed, so that the first application can still access the network resource by using the second network access point.

In addition, in the foregoing network access control methods shown in FIG. 1, FIG. 5A, and FIG. 5B, after accessing the third network access point, the electronic device may stop the first application, so as to prevent leakage of user data and improve security of the user data.

Figure 7:
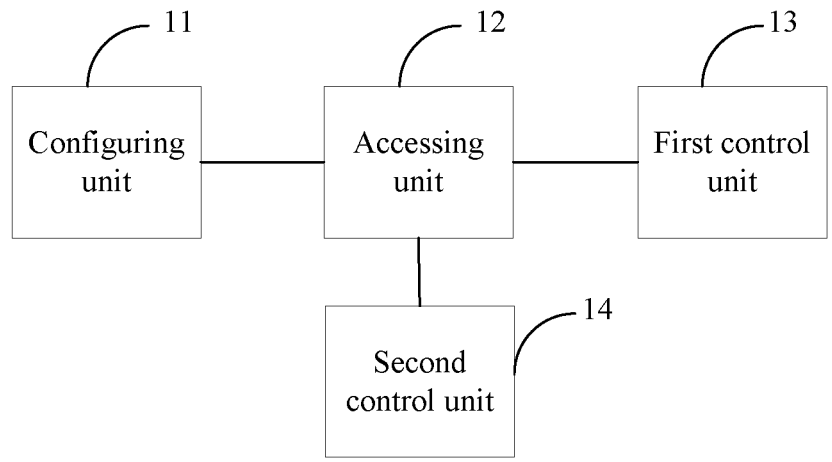
FIG. 7 is a schematic structural diagram of a network access control apparatus according to an embodiment of the present invention.

Corresponding to the foregoing method embodiments, an embodiment of the present invention further provides a network access control apparatus, where a schematic structural diagram of the network access control apparatus is shown in FIG. 7. The network access control apparatus may include: a configuring unit 11, an accessing unit 12, a first control unit 13, and a second control unit 14.

The configuring unit 11 is configured to configure network access permission of a first application, where the network access permission includes allowing the first application to access a network resource by using a first type of network access point, and the first type of network access point includes at least one first network access point.

It can be understood that the first type of network access point may be configured according to an application feature of the first application. For example, when the first application is an online play video, because the online play video has an application feature that a required data volume is relatively large and a data transmission rate is required to be high, a 3G (3rd-generation, 3rd-generation mobile communications technology) type of network access point may be configured for the online play video, and the 3G type of network access point is used as the first type of network access point; accordingly, the first network access point is a 3G network access point.

Likewise, when the first application is instant communication software, because the instant communication software has a relatively high requirement for immediacy of communication, a network access point that supports communication anytime and anywhere needs to be configured for the instant communication software. A wireless network can satisfy this requirement; therefore, a wireless type of access point may be used as a first type of network access point of the instant communication software, and a wireless network access point is used as the first network access point.

Certainly, in actual use of an electronic device, a human-computer interaction interface shown in FIG. 2 may be displayed on a display interface of the electronic device, where the human-computer interaction interface is used to manually configure the network access permission of the first application. After the corresponding network access permission is configured, the first application may access the network resource by using the configured first type of network access point.

The human-computer interaction interface includes two drop-down boxes: application and network. A user may select, from the application drop-down box, a first application for which a network needs to be configured. After selecting the first application for which a network needs to be configured, the user further selects a network type from the network drop-down box, and after an OK button is clicked, an access point of the selected network type is used as a first type of network access point of the first application. Each time after a network is selected and the OK button is clicked, it indicates that a type of first network access point is configured for the first application. In actual configuration, the user may configure a first network access point that involves a single type for the first application, or may configure first network access points that involve multiple types.

Certainly, if a network selected by the user is a network that has been configured for the first application, "A first network access point of this network type has been configured for the first application" may be displayed on the human-computer interaction interface, as shown in FIG. 3, so as to prompt the user not to configure a first network access point of the same network type for the first application again.

In addition, the human-computer interaction interface displayed on the display interface of the electronic device may also use a manner show in FIG. 4, and an optional network is displayed in a box below the application drop-down box. After the user selects a first application, multiple networks in the box may be selected at the same time, and first network access points of multiple network types are configured for the first application.

When a first network access point is manually configured for various first applications, the electronic device records, in a configuration file, the network type and the first network access point that are configured and the first applications, as shown below:

```
<network-config>
<app_name="app_1">
<network_type="WI-FI">
<ap_mac_add=" 00-23-5A-15-99-42">
</network-config>
``` app_name represents a name of a first application; network_type represents a network type, which may include a 2G (2nd-generation, 2nd-generation mobile communications technology) network, a 3G network, a WI-FI network, and an LTE (Long Term Evolution, Long Term Evolution) network; ap_mac_add represents a MAC (Media Access Control, Media Access Control) address of the WI-FI network.

It should be noted that, for the 2G network, the 3G network, and the LTE network, these networks are provided by an operator, and construction of these network is much more complex relative to construction of the WI-FI network; therefore, a hacker generally can only tamper with the MAC address of the WI-FI network. Therefore, when configurations of the foregoing first applications are being recorded, and when WI-FI is recorded in network_type, the MAC address of the WI-FI network needs to be correspondingly recorded in ap_mac_add. When 2G, 3G, and LTE are recorded in network_type, ap_mac_add is correspondingly left blank.

In this embodiment of the present invention, the first network access point may be a wireless network access point, where the wireless network access point may include at least one of the following access points: a 2G network access point, a 3G network access point, an LTE network access point, a WI-FI network access point, a Bluetooth network access point, a Zigbee network access point, and a WAPI network access point. The first network access point may also be a wired network access point, where the wired network access point may include: an Ethernet access point, a USB (Universal Serial Bus, Universal Serial Bus) network shared access point, and the like. Certainly, the first network access point may also include both a wireless network access point and a wired network access point. Specifically, the electronic device may allocate any one type of or multiple types of access points to a first application according to an application feature of the first application, which is not limited in this embodiment of the present invention.

In addition, the first network access point may also be a network access point that has trust permission, where the trust permission is used to identify a trust degree of the network access point. The trust degree of the network access point may be identified by using a network identifier shown in Table 1.

The accessing unit 12 is configured to access a second network access point, where the second network access point belongs to the first type of network access point.

The first control unit 13 is configured to: when the first application is running, allow the first application to access the network resource by using the second network access point.

In this embodiment of the present invention, after the electronic device is powered on, the accessing unit 12 may directly access the second network access point that belongs to the first type of network access point, where the second network access point is a first network access point in the first type of network access point, so as to ensure that when the electronic device runs the first application, the first control unit 13 may allow the first application to access the network resource by using the second network access point, thereby improving execution efficiency of the first application.

The network resource is an information resource that is propagated by using a communication device and that is managed by using network software by using a computer system, such as a video uploaded to a network.

The second control unit 14 is configured to: when a third network access point is accessed, if the third network access point does not belong to the first type of network access point, prohibit the first application from accessing the network resource by using the third network access point.

If the third network access point does not belong to the first type of network access point, it indicates that when the first application is configured, the first application is prohibited from accessing the network resource by using the third network access point. In this case, the second control unit 14 prohibits the first application from sending or receiving information by using the third network access point, and prohibits the first application from accessing the network resource by using the third network access point, so as to improve network security. After the network security is improved, security of a user resource that accesses the network is accordingly improved.

Further, in this embodiment of the present invention, a quantity of first applications that are in an electronic device and for which the network access permission needs to be configured is limited. If the electronic device directly accesses the second network access point after being powered on, when another application accesses the network resource, the electronic device needs to change an access point configuration. Therefore, in this embodiment of the present invention, after the electronic device is powered on, the foregoing accessing unit 12 shown in FIG. 7 may further be configured to access a fourth network access point, where the fourth network access point does not belong to the first type of network access point, so that the another application can directly access the network resource after the electronic device is powered on.

Figure 8:
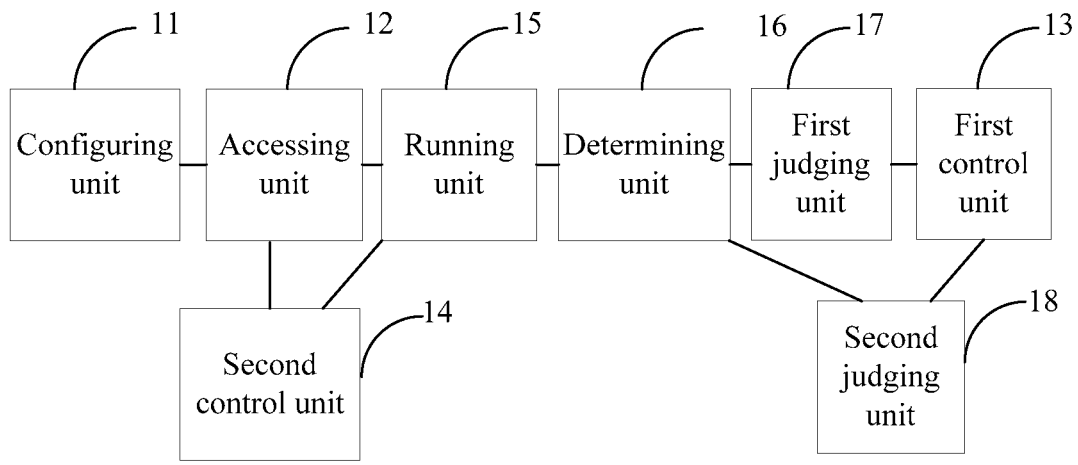
FIG. 8 is another schematic structural diagram of a network access control apparatus according to an embodiment of the present invention.

Correspondingly, based on FIG. 7, the network access control apparatus provided in this embodiment of the present invention may further include: a running unit 15, a determining unit 16, a first judging unit 17, and a second judging unit 18, as shown in FIG. 8.

The running unit 15 is configured to run the first application. The determining unit 16 is configured to determine that a network access point in a currently available network access point is a fifth network access point.

After the first application runs, the determining unit 16 detects the currently available network access point, and after the currently available network access point is detected, one of the currently available network access point is selected as the fifth network access point. An available network access point refers to a network access point whose network connection function is activated and that is located in network coverage corresponding to the network access point.

The first judging unit 17 is configured to: if the fifth network access point belongs to the first type of network access point, use the fifth network access point as the second network access point.

The second judging unit 18 is configured to: if the fifth network access point does not belong to the first type of network access point, use a sixth network access point as the second network access point, where the sixth network access point belongs to the first type of network access point.

Figure 9:
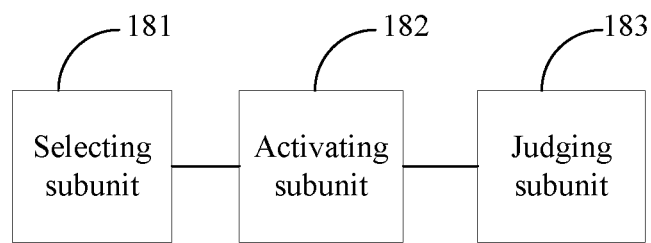
FIG. 9 is a schematic diagram of a sub-structure of a network access control apparatus according to an embodiment of the present invention.

In this embodiment of the present invention, a schematic structural diagram of the second judging unit 18 is shown in FIG. 9. The second judging unit 18 may include: a selecting subunit 181, an activating subunit 182, and a judging subunit 183.

The selecting subunit 181 is configured to select at least one first network access point in the first type of network access point as the sixth network access point. The selected first network access point may be a network access point configured by the configuring unit 11, and certainly the selected first network access point may also be a network access point that the electronic device accesses after the electronic device runs the first application, where the network access point is a trusted network access point selected by the user. After a network access point is selected by the user, the electronic device identifies that the network access point has trust permission, so as to identify a trust degree of the network access point. For a trust degree identifier of the network access point, refer to Table 1.

The activating subunit 182 is configured to activate a network connection function that is used to connect the selected sixth network access point. The network connection function may be a wireless network connection function, where the wireless network connection function may include at least one of the following network connection functions: a Bluetooth network connection function, a WI-FI network connection function, a 2G/3G/4G network connection function, a Zigbee network connection function, a WAPI network connection function, and the like. Certainly, the network connection function may also be a wired network connection function, which includes: a USB network connection function, an Ethernet connection function, and the like.

In addition, the network connection function may include both a wireless network connection function and a wired network connection function. A type of the network connection function is the same as a type of the sixth network access point. If the sixth network access point is a WI-FI network access point, when the network connection function a WI-FI network connection function.

The judging subunit 183 is configured to: if the selected sixth network access point is available, use the sixth network access point as the second network access point.

In this embodiment of the present invention, activation refers to enabling the network connection function. For example, the electronic device performs actions such as turning on a WI-FI switch, turning on a data traffic switch, and turning on a Bluetooth switch, and corresponding network connection functions are activated. All wireless network connection functions have a specific use range limit; therefore, being available is that in a current environment, the selected sixth network access point can be found by the electronic device and can be used for connection.

The WI-FI network connection function is used as an example. Activating the network connection function that is used to connect the selected sixth network access point is turning on the WI-FI switch of the electronic device; then, a nearby available WI-FI network access point is found by using a WI-FI module of the electronic device, and a network access point corresponding to the sixth network access point is searched for from the nearby available WI-FI network access point; and if the network access point is found, it indicates that the sixth network access point is available currently, and if the network access point is not found, the sixth network access point is unavailable currently.

When all the foregoing apparatus embodiments are applied to an electronic device that supports access of at least two types of network access points at the same time, in all the foregoing apparatus embodiments, the accessing unit 12 is further configured to keep a connection to the second network access point. The first control unit 13 is further configured to keep the first application accessing the network resource by using the second network access point, and the second control unit 14 may control the another application to access the network resource by using the third network access point, which improves flexibility of access point configuration.

It can be understood that the electronic device may include multiple network modules, and each network module represents that access of a type of network access point is supported by the electronic device. For example, when the electronic device has a mobile network module and a WI-FI network module, it indicates that the electronic device can support access to both a mobile network and a WI-FI network. The mobile network may be a 2G network, or a 3G network, or an LTE network that is provided by an operator, which specifically needs to be determined by the mobile network module in the electronic device. Certainly, if the electronic device has two same network modules, such as WI-FI network modules, the electronic device can also support access to two WI-FI networks.

In addition, in all the foregoing apparatus embodiments, the second control unit 14 may further be configured to: if the third network access point does not belong to the first type of network access point, stop the first application, so as to prevent leakage of user data and improve security of the user data.

The foregoing network access control apparatus may be included in the electronic device and control execution of the first application and the another application in the electronic device. For a specific structure and a working process of the network access control apparatus, refer to the foregoing apparatus embodiments and method embodiments, and details are not described again.

Corresponding to the foregoing method embodiments and apparatus embodiments, an embodiment of the present invention further provides an electronic device, where the electronic device includes a network interface, a processor, and a memory.

The memory is configured to store network access permission of a first application, where the network access permission includes allowing the first application to access a network resource by using a first type of network access point, and the first type of network access point includes at least one first network access point.

In this embodiment of the present invention, the first network access point may be a wireless network access point, where the wireless network access point may include at least one of the following access points: a 2G network access point, a 3G network access point, an LTE network access point, a WI-FI network access point, a Bluetooth network access point, a Zigbee network access point, and a WAPI network access point. The first network access point may also be a wired network access point, where the wired network access point may include: an Ethernet access point, a USB network shared access point, and the like. Certainly, the first network access point may also include both a wireless network access point and a wired network access point. Specifically, the electronic device may allocate any one type of or multiple types of access points to a first application according to an application feature of the first application, which is not limited in this embodiment of the present invention.

In addition, the first network access point may also be a network access point that has trust permission, where the trust permission is used to identify a trust degree of the network access point. The trust degree of the network access point may be identified by using a network identifier shown in Table 1.

The network interface is configured to access a second network access point, where the second network access point belongs to the first type of network access point.

The processor is configured to: configure the network access permission of the first application; when the first application is running, allow the first application to access the network resource by using the second network access point; configured to control the network interface to be switched from the second network access point to a third network access point for access; and if the third network access point does not belong to the first type of network access point, prohibit the first application from accessing the network resource by using the third network access point.

After the electronic device is powered on, the network interface may directly access the second network access point that belongs to the first type of network access point, where the second network access point is a first network access point in the first type of network access point, so as to ensure that when the electronic device runs the first application, the processor may allow the first application to access the network resource by using the second network access point, thereby improving execution efficiency of the first application.

The network resource is an information resource that is propagated by using a communication device and that is managed by using network software by using a computer system, such as a video uploaded to a network.

When the network interface accesses the third network access point, if the third network access point does not belong to the first type of network access point, it indicates that when the first application is configured, the first application is prohibited from accessing the network resource by using the third network access point. In this case, the processor prohibits the first application from sending or receiving information by using the third network access point, and prohibits the first application from accessing the network resource by using the third network access point, so as to improve network security. After the network security is improved, security of a user resource that accesses the network is accordingly improved.

In addition, before accessing the second network access point, the network interface may also first access a fourth network access point, where the fourth network access point does not belong to the first type of network access point. The processor runs the first application, and determines that a network access point in a currently available network access point is a fifth network access point. If the fifth network access point belongs to the first type of network access point, the fifth network access point is used as the second network access point, and the network interface is instructed to access the second network access point.

An available network access point refers to a network access point whose network connection function is activated and that is located in network coverage corresponding to the network access point.

If the fifth network access point does not belong to the first type of network access point, the processor uses a sixth network access point as the second network access point, where the sixth network access point belongs to the first type of network access point.

A process in which the processor uses the sixth network access point as the second network access point may include: selecting at least one first network access point in the first type of network access point as the sixth network access point; activating a network connection function that is used to connect the selected sixth network access point; and if the selected sixth network access point is available, using the sixth network access point as the second network access point.

The selected first network access point may be a configured network access point, and certainly the selected first network access point may also be a network access point that the network interface accesses after the electronic device runs the first application, where the network access point is a trusted network access point selected by a user. After a network access point is selected by the user, the processor identifies that the network access point has trust permission, so as to identify a trust degree of the network access point. For a trust degree identifier of the network access point, refer to Table 1.

In this embodiment of the present invention, activation refers to enabling the network connection function. For example, the electronic device performs actions such as turning on a WI-FI switch, turning on a data traffic switch, and turning on a Bluetooth switch, and corresponding network connection functions are activated. The network connection function may be a wireless network connection function, where the wireless network connection function may include at least one of the following network connection functions: a Bluetooth network connection function, a WI-FI network connection function, a 2G/3G/4G network connection function, a Zigbee network connection function, a WAPI network connection function, and the like. Certainly, the network connection function may also be a wired network connection function, which includes: a USB network connection function, an Ethernet connection function, and the like.

In addition, the network connection function may include both a wireless network connection function and a wired network connection function. A type of the network connection function is the same as a type of the sixth network access point. If the sixth network access point is a WI-FI network access point, when the network connection function a WI-FI network connection function.

All wireless network connection functions have a specific use range limit; therefore, being available is that in a current environment, the selected sixth network access point can be found by the electronic device and can be used for connection.

The WI-FI network connection function is used as an example. Activating the network connection function that is used to connect the selected sixth network access point is turning on the WI-FI switch of the electronic device; then, a nearby available WI-FI network access point is found by using a WI-FI module of the electronic device, and a network access point corresponding to the sixth network access point is searched for from the nearby available WI-FI network access point; and if the network access point is found, it indicates that the sixth network access point is available currently, and if the network access point is not found, the sixth network access point is unavailable currently.

In addition, if the third network access point does not belong to the first type of network access point, the processor may also stop the first application. The electronic device may include multiple network interfaces, and after a network interface accesses the third network access point, another network interface may still keep a connection to the second network access point. The processor keeps the first application accessing the network resource by using the second network access point.

It should be noted that, all embodiments in this specification are described in a progressive manner; what each embodiment emphasizes is a difference from another embodiment; and mutual reference may be made to a same or similar part between the embodiments. The method embodiments are basically the same as the system embodiments and therefore are described briefly, and for the relevant parts, reference may be made to the corresponding description of the apparatus embodiments.

Finally, it should be noted that in this specification, relational terms such as first and second are used only to differentiate an entity or operation from another entity or operation, and do not necessarily require or imply that any actual relationship or sequence exists between these entities or operations. Moreover, the terms "include", "comprise", and any variation thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. If no more limitations are made, an element limited by "include a/an . . . " does not exclude other same elements existing in the process, method, object, or device which includes the element.

The foregoing is merely preferred implementation manners of embodiments of the present invention. It should be noted by a person of ordinary skill in the art that various improvements and modifications may be further made without departing from the principles of the embodiments of the present invention and should be also construed as falling within the protection scope of the embodiments of the present invention.

What is claimed is:

1. An electronic device, comprising:
   one or more processors;
   a memory configured to store programming instructions that, when executed by the one or more processors, cause the electronic device to:
      access a first wireless fidelity network access point (Wi-Fi AP), wherein the first Wi-Fi AP is determined by the electronic device to be a trusted Wi-Fi AP;
      initiate an execution of a first application;
      initiate an execution of a second application;
      access a first network resource for the first application;
      access a second network resource for the second application via the first Wi-Fi AP;
      access a second Wi-Fi AP, wherein the second Wi-Fi AP is determined by the electronic device to be an untrusted Wi-Fi AP;
      in response to determining that the second Wi-Fi AP is the untrusted Wi-Fi AP, prohibit the first application from sending user data via the second Wi-Fi AP while allowing the second application to continue to access the second network resource via the second Wi-Fi AP without releasing a connection with the second Wi-Fi AP.

2. The electronic device according to claim 1, wherein the first application is an instant communication software or an online banking application.

3. The electronic device according to claim 1, wherein the second Wi-Fi AP is a free access point.

4. The electronic device according to claim 1, wherein the memory is further configured to store programming instructions that, when executed by the one or more processors, cause the electronic device to:
   determine whether the second Wi-Fi AP is a trusted Wi-Fi AP.

5. The electronic device according to claim 1, wherein the memory is further configured to store programming instructions that, when executed by the one or more processors, cause the electronic device to:
   display an application list, wherein the application list comprises the first application and the second application;
   obtain an input selection for the first application from the application list; and
   record an identification of the first application in a configuration file, wherein the configuration file is used in a network access control process.

6. The electronic device according to claim 5, wherein the configuration file comprises a network type, and said network type comprises at least one of the following: a 2nd-generation (2G) network, a 3rd-generation (3G) network, an Long Term Evolution (LTE) network, or a wireless fidelity (Wi-Fi) network.

7. The electronic device according to claim 1, wherein the memory is further configured to store programming instructions that, when executed by the one or more processors, cause the electronic device to:
   stop the execution of the first application for prohibiting the first application from sending user data via the second Wi-Fi AP.

8. The electronic device according to claim 1, wherein the memory is further configured to store programming instructions that, when executed by the one or more processors, cause the electronic device to:
   access a third Wi-Fi AP;
   maintain access to the second Wi-Fi AP, wherein the third Wi-Fi AP is determined by the electronic device to be a trusted Wi-Fi AP;
   access the first network resource for the first application via the third Wi-Fi AP; and
   access the second network resource for the second application via the second Wi-Fi AP.

9. A method for controlling network access of an electronic device, the method comprising:
   accessing a first wireless fidelity network access point (Wi-Fi AP), wherein the first Wi-Fi AP is determined to be a trusted Wi-Fi AP;
   initiating an execution of a first application;
   initiating an execution of a second application;
   accessing a first network resource for the first application;
   accessing a second network resource for the second application via the first Wi-Fi AP;
   accessing a second Wi-Fi AP, wherein the second Wi-Fi AP is determined to be an untrusted Wi-Fi AP;
   in response to determining that the second Wi-Fi AP is the untrusted Wi-Fi AP, prohibiting the first application from sending user data via the second Wi-Fi AP; while allowing the second application to continue to access the second network resource via the second Wi-Fi AP without releasing a connection with the second Wi-Fi AP.

10. The method according to claim 9, wherein the first application is an instant communication software or an online banking application.

11. The method according to claim 9, wherein the second Wi-Fi AP is a free access point.

12. The method according to claim 9, further comprising:
    determining whether the second Wi-Fi AP is a trusted Wi-Fi AP.

13. The method according to claim 9, further comprising:
    displaying an application list, wherein the application list comprises the first application and the second application;
    obtaining an input selection for the first application from the application list; and
    recording an identification of the first application in a configuration file, wherein the configuration file is used in a network access control process.

14. The method according to claim 13, wherein the configuration file comprises a network type, and said network type comprises at least one of the following: a 2nd-generation (2G) network, a 3rd-generation (3G) network, an Long Term Evolution (LTE) network, or a wireless fidelity (Wi-Fi) network.

15. The method according to claim 9, further comprising:
stopping the execution of the first application for prohibiting the first application from sending user data via the second Wi-Fi AP.

16. The method according to claim 9, further comprising:
accessing a third Wi-Fi AP;
maintaining access to the second Wi-Fi AP, wherein the third Wi-Fi AP is determined to be a trusted Wi-Fi AP;
accessing the first network resource for the first application via the third Wi-Fi AP; and
access the second network resource for the second application via the second Wi-Fi AP.

17. An electronic device, comprising:
one or more processors;
a memory configured to store programming instructions that, when executed by the one or more processors, cause the electronic device to:
access a first wireless fidelity network access point (Wi-Fi AP), wherein the first Wi-Fi AP is determined to be a trusted Wi-Fi AP;
initiate an execution of a first application;
initiate an execution of a second application;
access a first network resource for the first application;
access a second network resource for the second application via the first Wi-Fi AP;
access a second Wi-Fi AP, wherein the second Wi-Fi AP is determined to be an untrusted Wi-Fi AP;
in response to determining that the second Wi-Fi AP is the untrusted Wi-Fi AP, interrupt a user operation for accessing the first network resource for the first application via the second Wi-Fi AP while allowing the second application to continue to access the second network resource via the second Wi-Fi AP without releasing a connection with the second Wi-Fi AP.

18. The electronic device according to claim 17, wherein the memory is further configured to store programming instructions that, when executed by the one or more processors, cause the electronic device to:
determine whether the second Wi-Fi AP is a trusted Wi-Fi AP.

19. The electronic device according to claim 17, wherein memory is further configured to store programming instructions that, when executed by the one or more processors, cause the electronic device to:
display an application list, wherein the application list comprises the first application and the second application;
obtain an input selection for the first application from the application list; and
record an identification of the first application in a configuration file, wherein the configuration file is used in a network access control process.

20. The electronic device according to claim 17, wherein the memory is further configured to store programming instructions that, when executed by the one or more processors, cause the electronic device to:
stop the execution of the first application for prohibiting the first application from sending user data via the second Wi-Fi AP.

* * * * *